US008998569B2

(12) United States Patent
Witlicki

(10) Patent No.: US 8,998,569 B2
(45) Date of Patent: Apr. 7, 2015

(54) GAS TURBINE ENGINE INTERNAL COMPARTMENT STRUCTURE HAVING EGRESS FEATURE

(75) Inventor: Russell B. Witlicki, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 864 days.

(21) Appl. No.: 13/211,404

(22) Filed: Aug. 17, 2011

(65) Prior Publication Data

US 2013/0042628 A1 Feb. 21, 2013

(51) Int. Cl.

| | |
|---|---|
| ***F02C 7/20*** | (2006.01) |
| ***B21D 53/78*** | (2006.01) |
| ***F01D 25/16*** | (2006.01) |
| ***F01D 17/08*** | (2006.01) |
| ***F01D 25/18*** | (2006.01) |

(52) U.S. Cl.

CPC .............. *F01D 25/162* (2013.01); *F01D 17/08* (2013.01); *F01D 25/18* (2013.01); *F05D 2270/301* (2013.01)

(58) Field of Classification Search

CPC ....... F01D 17/08; F01D 25/18; F01D 25/162; F05D 2270/301

USPC ........ 415/118, 122.1, 142, 170.1, 182.1, 229; 29/889

See application file for complete search history.

(56) References Cited

U.S. PATENT DOCUMENTS

| | | | | |
|---|---|---|---|---|
| 4,075,562 | A * | 2/1978 | Karstensen et al. | 60/796 |
| 4,969,263 | A | 11/1990 | Adams | |
| 5,735,666 | A * | 4/1998 | Johnston | 415/34 |
| 5,979,220 | A | 11/1999 | Zombo et al. | |
| 6,030,176 | A * | 2/2000 | Oeynhausen | 415/214.1 |
| 6,412,339 | B1 * | 7/2002 | Care | 73/86 |
| 7,568,843 | B2 | 8/2009 | Lefebvre et al. | |
| 2006/0218927 | A1 * | 10/2006 | Singh et al. | 60/772 |
| 2007/0186687 | A1 * | 8/2007 | Haaser et al. | 73/862.06 |

* cited by examiner

*Primary Examiner* — Igor Kershteyn
(74) *Attorney, Agent, or Firm* — Carlson, Gaskey & Olds

(57) ABSTRACT

A gas turbine engine includes a gas turbine engine internal compartment structure having an integral passageway. Wiring is routed through the integral passageway of the gas turbine engine internal compartment structure.

20 Claims, 6 Drawing Sheets

GAS TURBINE ENGINE INTERNAL COMPARTMENT STRUCTURE HAVING EGRESS FEATURE

BACKGROUND

This disclosure relates to a gas turbine engine, and more particularly to a gas turbine engine internal compartment structure having an integral passageway that acts as an egress feature for routing wiring, tubing or the like.

Gas turbine engines, such as those in commercial or military operation, generally include a compressor section, a combustor section and a turbine section. Airflow is compressed in the compressor section and is communicated to the combustor section where it is mixed with fuel and burned to generate hot combustion gases. The turbine section extracts heat from the hot combustion gases to power the compressor section as well as other gas turbine engine loads.

A gas turbine engine generally includes a plurality of internal compartments, including numerous pressurized bearing compartments. It is often necessary to route wiring (i.e., wires, tubes or the like) from inside of the pressurized compartments to a position external from the gas turbine engine. For example, instrumentation wiring, such as for pressure and temperature sensors located inside a pressurized bearing compartment, must be routed from inside of the bearing compartment to a position outside of the gas turbine engine for connection to auxiliary devices such as an engine control unit (ECU), controller or other electronic device.

SUMMARY

A gas turbine engine includes a gas turbine engine internal compartment structure having an integral passageway. Wiring is routed through the integral passageway of the gas turbine engine internal compartment structure.

In another exemplary embodiment, a bearing system for a gas turbine engine includes a bearing housing and a bearing cover connected to the bearing housing. The bearing cover includes an integral passageway that opens to expose at least a portion of the bearing housing.

In yet another exemplary embodiment, a method of assembling a gas turbine engine includes integrally casting a passageway into a gas turbine engine internal compartment structure. Wiring is routed along the entire length of the gas turbine engine internal compartment structure, including through the integrally cast passageway. The gas turbine engine internal compartment structure is installed onto the gas turbine engine.

The various features and advantages of this disclosure will become apparent to those skilled in the art from the following detailed description. The drawings that accompany the detailed description can be briefly described as follows.

DETAILED DESCRIPTION

Figure 1:
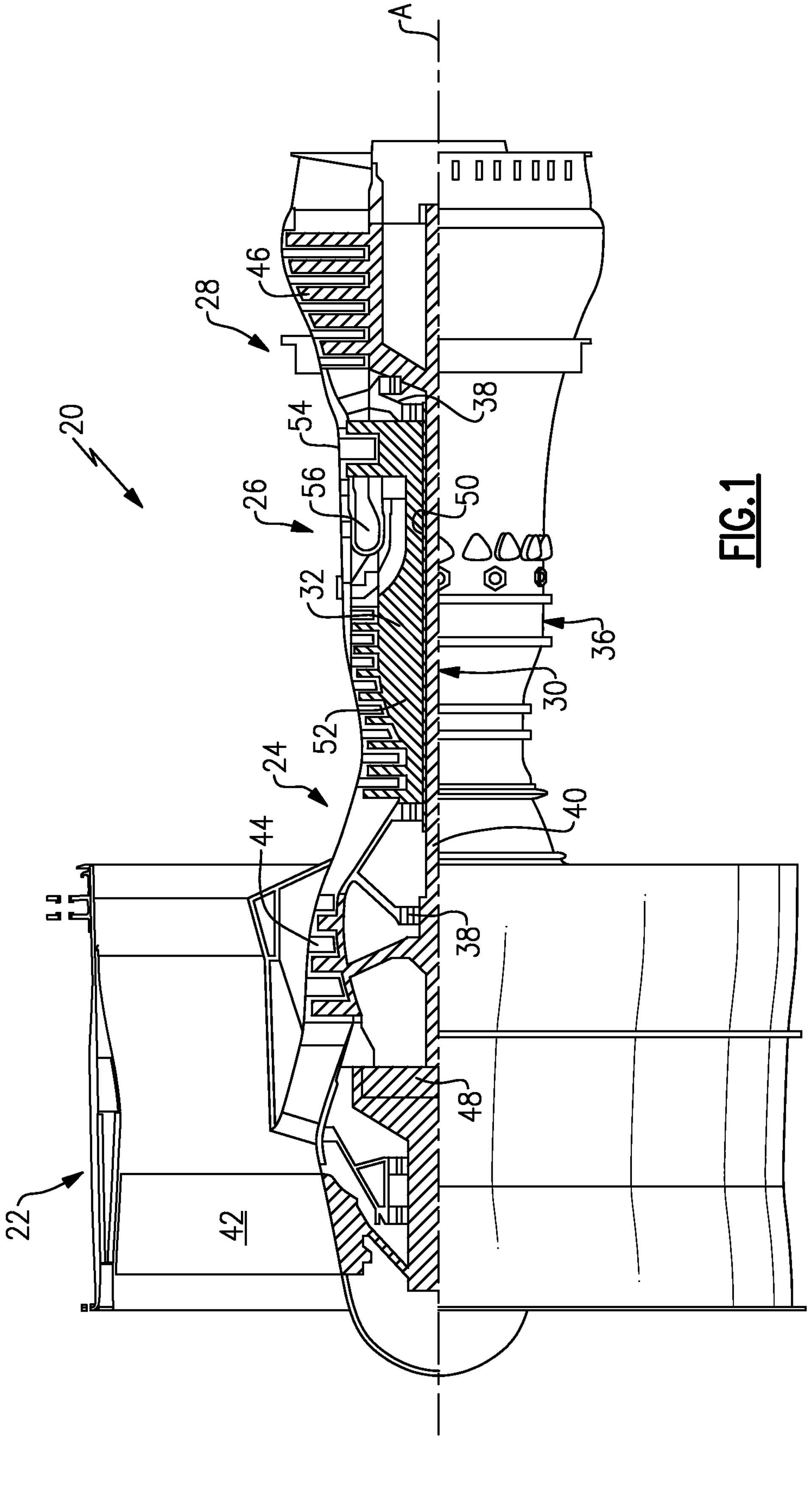
FIG. 1 is a schematic cross-section of a gas turbine engine.

FIG. 1 schematically illustrates a gas turbine engine 20. The example gas turbine engine 20 is a two spool turbofan engine that generally incorporates a fan section 22, a compressor section 24, a combustor section 26 and a turbine section 28. Alternative engines might include an augmenter section (not shown) among other systems or features. Generally, the fan section 22 drives air along a bypass flow path, while the compressor section 24 drives air along a core flow path for compression and communication into the combustor section 26. The hot combustion gases generated in the combustor section 26 are expanded through the turbine section 28. This view is highly schematic and is included to provide a basic understanding of the gas turbine engine 20 and not to limit the disclosure. This disclosure extends to all types of gas turbine engines and for all types of applications.

The gas turbine engine 20 generally includes a low speed spool 30 and a high speed spool 32 mounted for rotation about an engine centerline axis A relative to an engine static structure 36 via several bearing systems 38. It should be understood that various bearing systems 38 at various locations may alternatively or additionally be provided. The bearing systems 38, along with other gas turbine engine structures and systems, define internal compartments that are sometimes pressurized. Wiring (i.e., wires, electrical wires, tubing or other circuitry) may need to be routed from the internal compartments to a location external from the gas turbine engine 20 to connect instrumentation with auxiliary devices, as is further discussed below.

The low speed spool 30 generally includes an inner shaft 40 that interconnects a fan 42, a low pressure compressor 44, and a low pressure turbine 46. The inner shaft 40 can be connected to the fan 42 through a geared architecture 48 to drive the fan 42 at a lower speed than the low speed spool 30. The high speed spool 32 includes an outer shaft 50 that interconnects a high pressure compressor 52 and a high pressure turbine 54. A combustor 56 is arranged between the high pressure compressor 52 and the high pressure turbine 54. The inner shaft 40 and the outer shaft 50 are concentric and rotate about the engine's centerline axis A, which is collinear with their longitudinal axes. The core airflow is compressed by the low pressure compressor 44 and the high pressure compressor 52, is mixed with fuel and burned within the combustor 56, and is then expanded over the high pressure turbine 54 and the low pressure turbine 46. The turbines 54, 46 rotationally drive the low speed spool 30 and the high speed spool 32 in response to the expansion.

Figure 2:
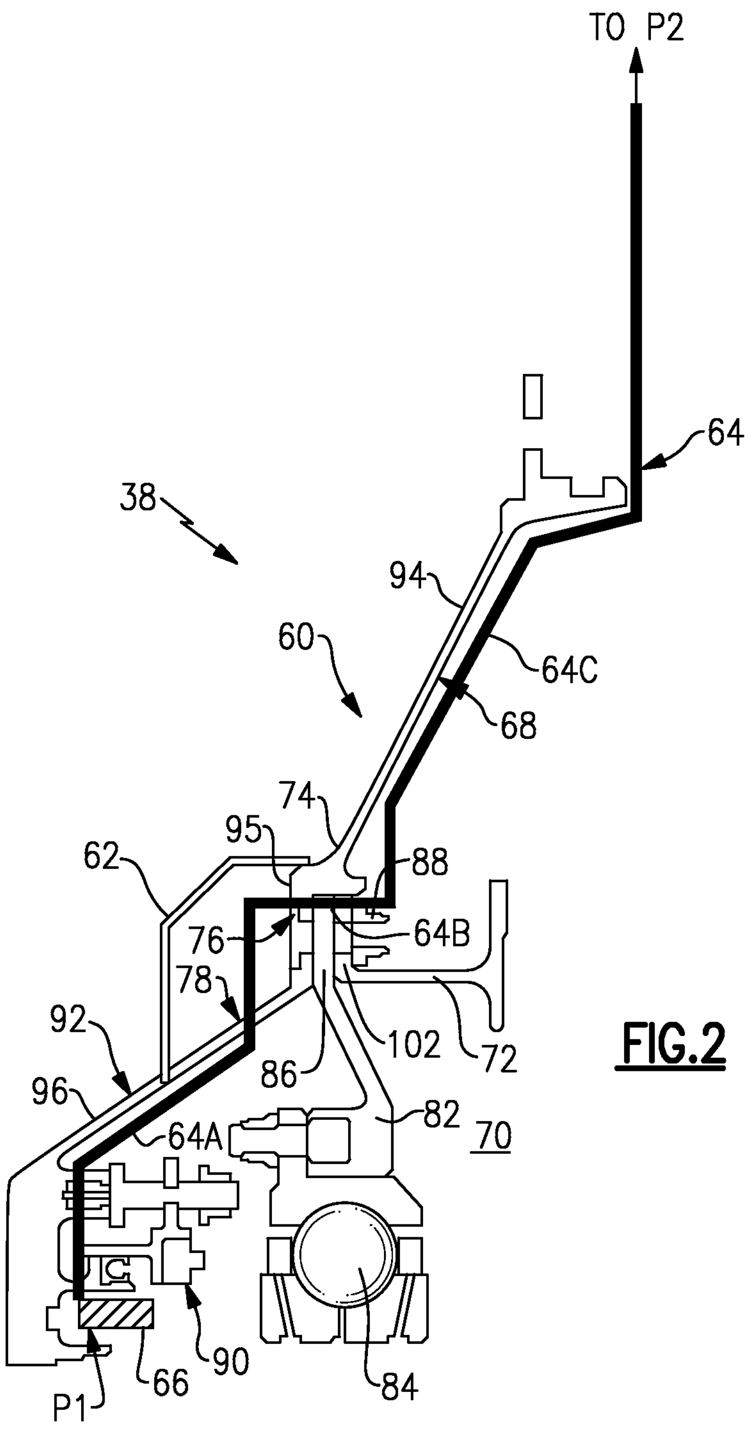
FIG. 2 illustrates a gas turbine engine internal compartment structure that defines an internal compartment.

FIG. 2 illustrates a gas turbine engine internal compartment structure 60 of the gas turbine engine 20. The gas turbine engine internal compartment structure 60 establishes an internal compartment 70. The internal compartment 70 is pressurized to provide a closed environment for lubricating oil, etc. The internal compartment 70 could also have a lower pressure if desired (i.e., lower than ambient pressure).

The gas turbine engine internal compartment structure 60 includes an integral passageway 62. The integral passageway 62 can be a cast or machined feature that is formed integrally with the gas turbine engine internal compartment structure 60. The integral passageway 62 could also be a fabricated feature achieved by forming sheet metal or by machining pieces and welding the pieces together to form a tunnel-like structure that can then be welded or brazed to become integral with the gas turbine engine internal compartment structure 60. As the term is used in this disclosure, "integral" means without the use of any mechanical attachments. That is, the gas turbine engine internal compartment structure 60 and the integral passageway 62 embody a single-piece construction (i.e., a monolithic structure).

Wiring 64 is routed from a position P1 inside of the gas turbine engine internal compartment structure 60 (i.e., within the internal compartment 70) to a position P2 that is external from the gas turbine engine 20. The wiring 64 connects instrumentation 66 that is mounted within the internal compartment 70, such as sensors, to an auxiliary device (i.e., a controller, computer or other electronic device) located external from the gas turbine engine 20. The wiring 64 is secured along an entire length of the gas turbine engine internal compartment structure 60 at a downstream wall 68 of the gas turbine engine internal compartment structure 60. In other words, the wiring 64 is completely secured inside the internal compartment 70 without breaching the internal compartment 70.

Figure 6:
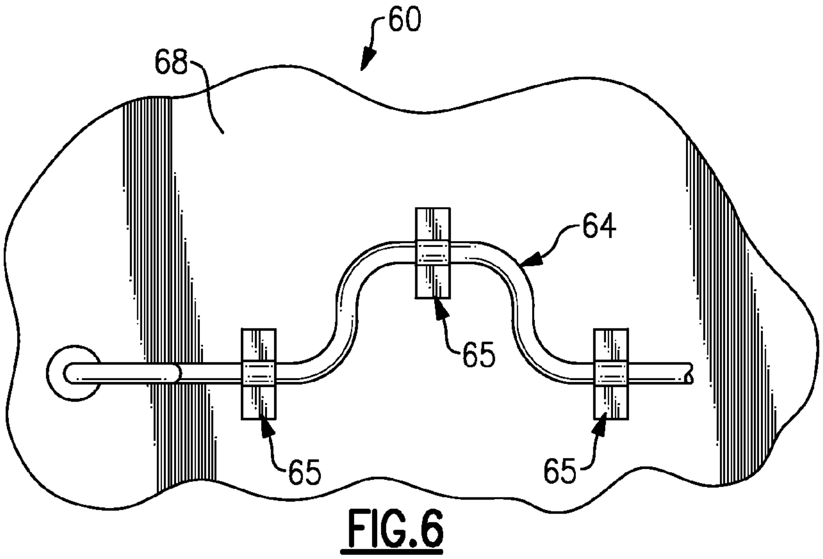
FIG. 6 illustrates wiring secured relative to a gas turbine engine internal compartment structure.

The wiring 64 can be secured to the gas turbine engine internal compartment structure 60 with a plurality of tack straps 65. The tack straps 65 are arranged as desired and are placed over the wiring 64 and then tacked (i.e., welded) to the gas turbine engine internal compartment structure 60 to secure the wiring along a surface, such as the downstream wall 68 (See FIG. 6). The tack straps 65 are made from a similar material as the gas turbine engine internal compartment structure 60 to facilitate such an attachment.

In one example, the gas turbine engine internal compartment structure 60 is a portion of a bearing system 38 of the gas turbine engine 20. It should be understood that any gas turbine engine internal compartment structure may utilize an integral passageway 62 or other similar egress feature as those described herein. For example, the gas turbine engine internal compartment structure 60 could be included as part of a gear system.

The bearing system 38 includes a bearing housing 72 and a bearing cover 74 that is connected to the bearing housing 72. A bearing support 82 supports a bearing 84 within the internal compartment 70. A flange 86 of the bearing support 82 extends between the bearing cover 74 and the bearing housing 72. Fasteners 88, such as a bolt secured by a nut, mount the bearing housing 72, the bearing cover 74 and the bearing support 82 relative to one another. The bearing system 38 may further include one or more seals 90 that seal the internal compartment 70. The seals 90 can include carbon seals, seal plates, or any other adequate sealing device.

In this example, the bearing cover 74 includes a radially inner portion 96, a radially outer portion 94 and a flange 95 that extends between the radially inner portion 96 and the radially outer portion 94. The bearing cover 74 includes the integral passageway 62. The integral passageway includes a first opening 76 through the flange 95 that opens to expose at least a portion of the bearing support 82 and the bearing housing 72 and a second opening 78 that extends through the radially inner portion 96 of the bearing cover 74. The integral passageway 62 allows the wiring 64 to be routed through the bearing system 38 (prior to installation of the bearing system 38 onto the gas turbine engine 20) without breaching the internal compartment 70 such that additional sealing is not required.

To route the wiring 64 from position P1 to position P2, a first portion 64A of the wiring 64 is routed along the radially inner portion 96 of the bearing cover 74, a second portion 64B of the wiring 64 is routed through the integral passageway 62 via openings 76 and 78, and a third portion 64C of the wiring 64 is routed along the radially outer portion 94 of the bearing cover 74. In this way, the wiring 64 is secured along an entire length of the bearing cover 74.

Figure 3A:
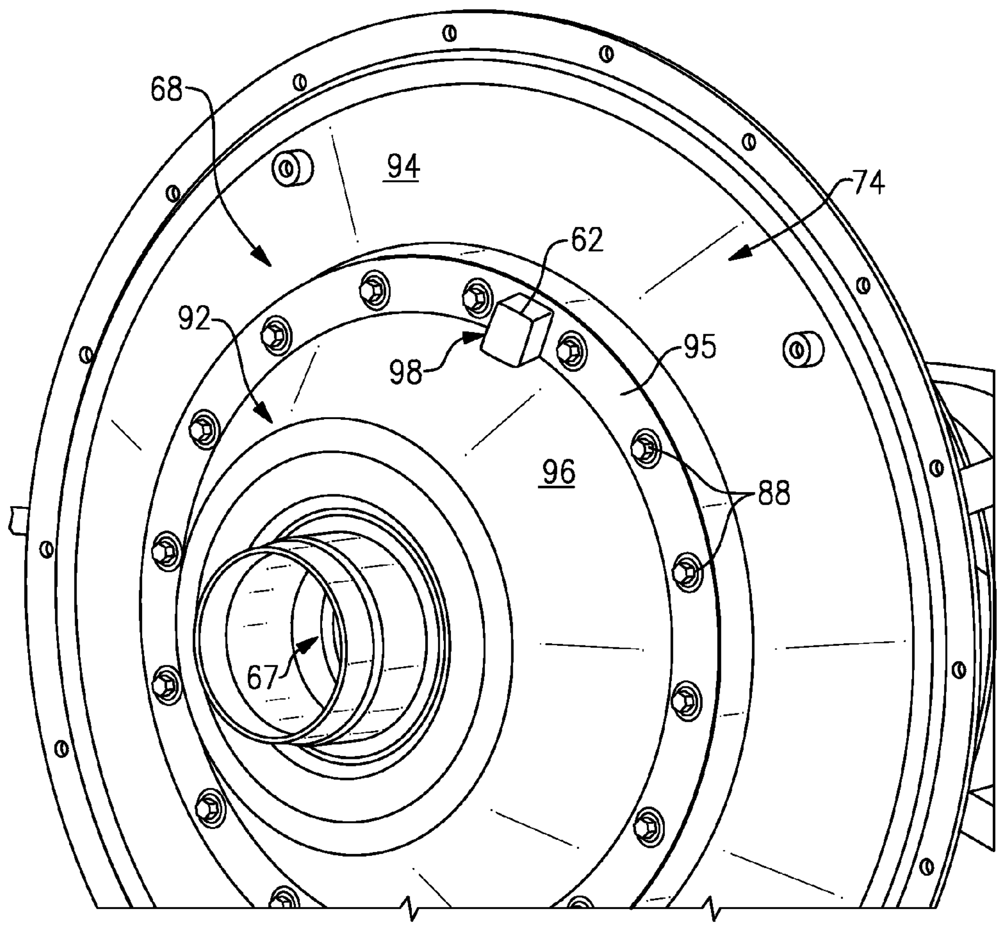
FIGS. 3A and 3B illustrate portions of a bearing system of a gas turbine engine.
Figure 3B:
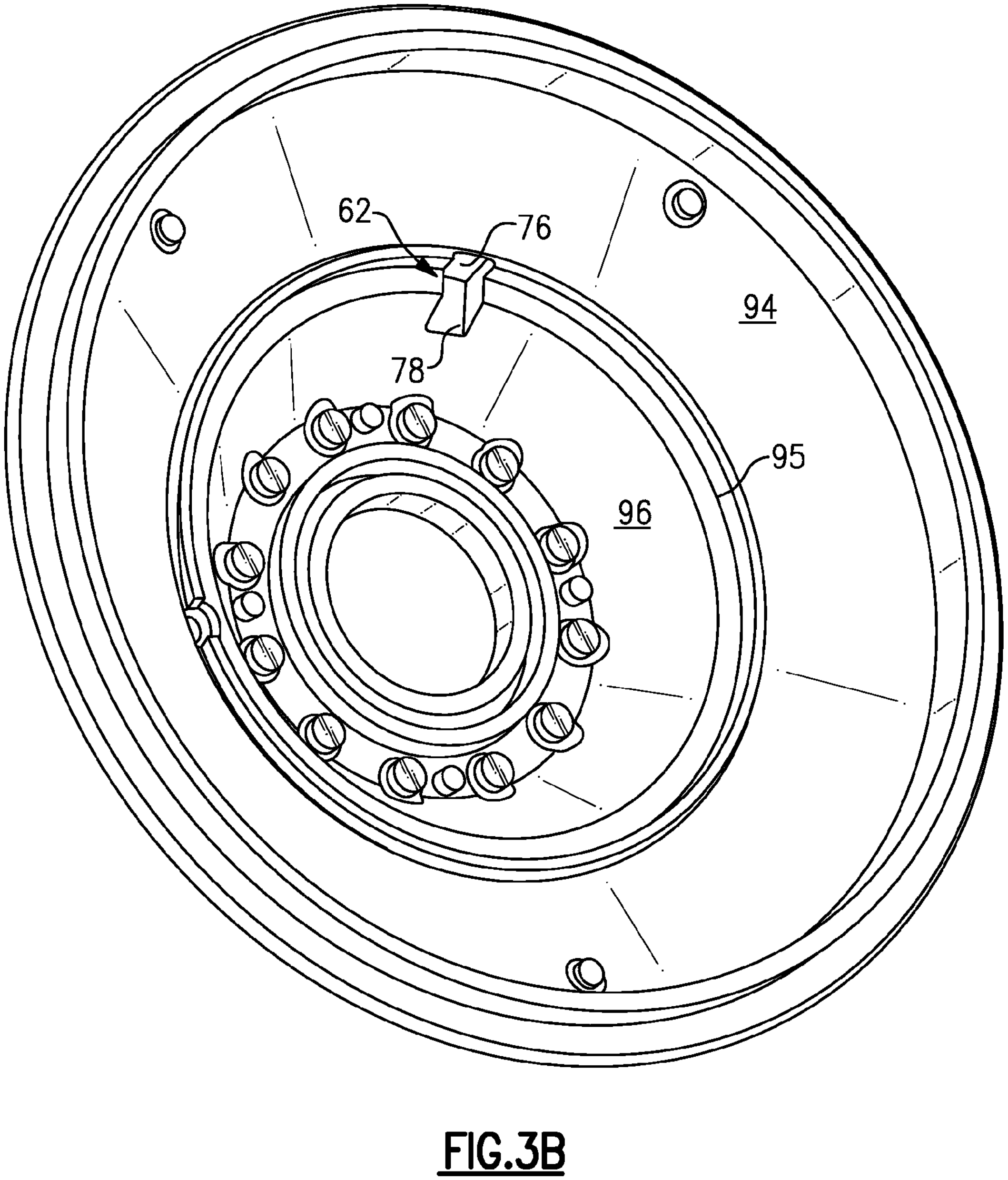

Referring to FIGS. 3A and 3B, the bearing cover 74 includes an upstream wall 92, a downstream wall 68, a central opening 67 and the radially inner and outer portions 96, 94. The integral passageway 62 extends between the upstream wall 92 and the downstream wall 68. In this example, the first opening 76 extends through the flange 95 of the bearing cover 74 and the second opening 78 extends through the radially inner portion 96 of the bearing cover 74. This location is described for exemplary purposes only, and it should be understood that the integral passageway 62 could be positioned at any location of the bearing system 38 depending upon wiring requirements and other design criteria.

The integral passageway 62 includes a housing 98 that protrudes from the upstream wall 92 of the bearing cover 74. The housing 98 houses the portion 64B of wiring 64 that extends through the integral passageway 62 (See FIG. 2). In other words, the entirety of the wiring 64 is routed on the downstream wall 68 side of the bearing cover 74. A plurality of fasteners 88 extends through the upstream wall 92 in a direction toward the downstream wall 68 to connect the bearing cover 74 to the bearing housing 72.

Figure 4:
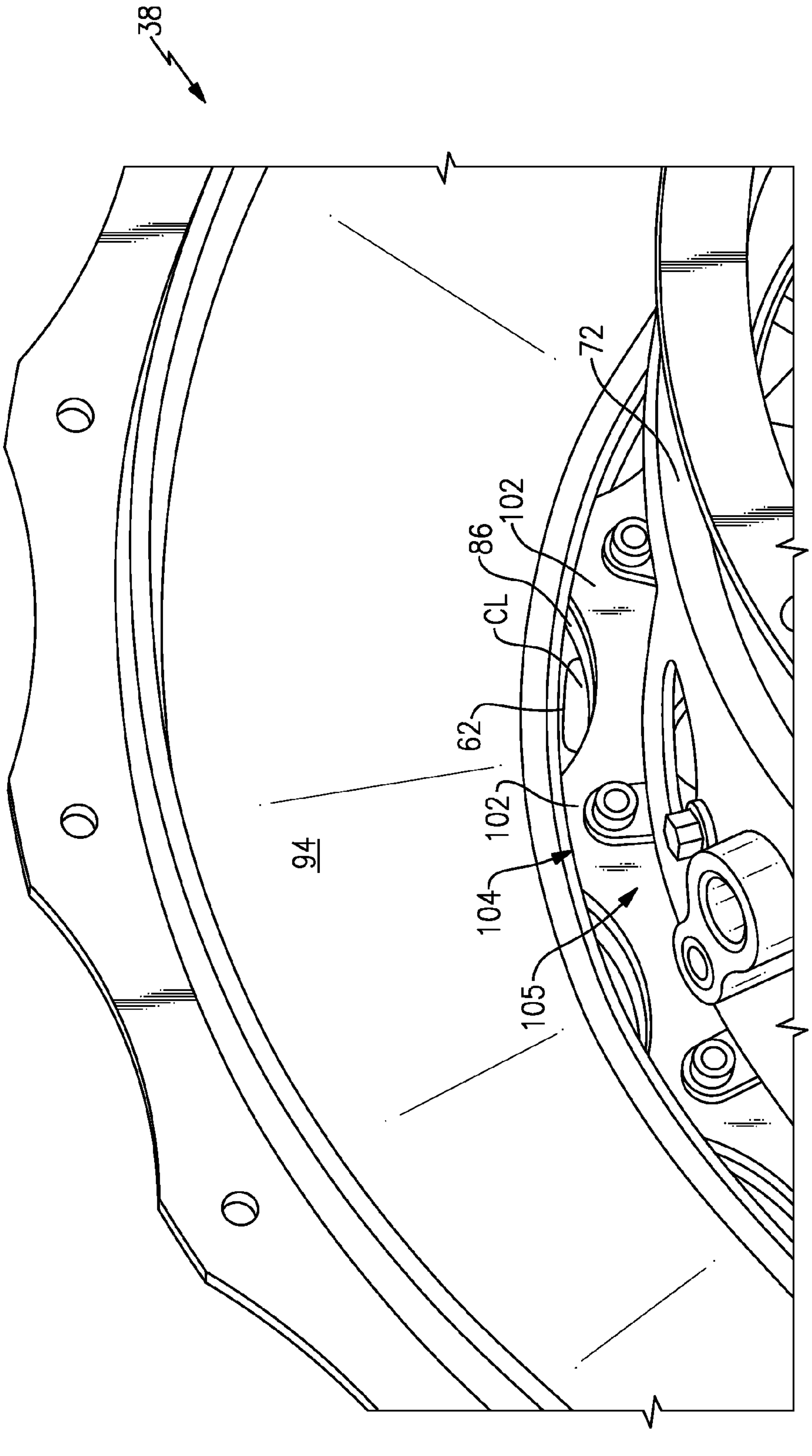
FIG. 4 illustrates an example bearing system.

FIG. 4 illustrates a rear view of the bearing system 38. The bearing housing 72 includes a plurality of scalloped flanges 102 that are defined at a radially outer surface 104 of an upstream body 105 of the bearing housing 72. The plurality of the scalloped flanges 102 create a clearance CL for the wiring 64 to egress through the integral passageway 62 and through the bearing housing 72 such that the wiring 64 can be egressed to a position external from the gas turbine engine 20.

Figure 5:
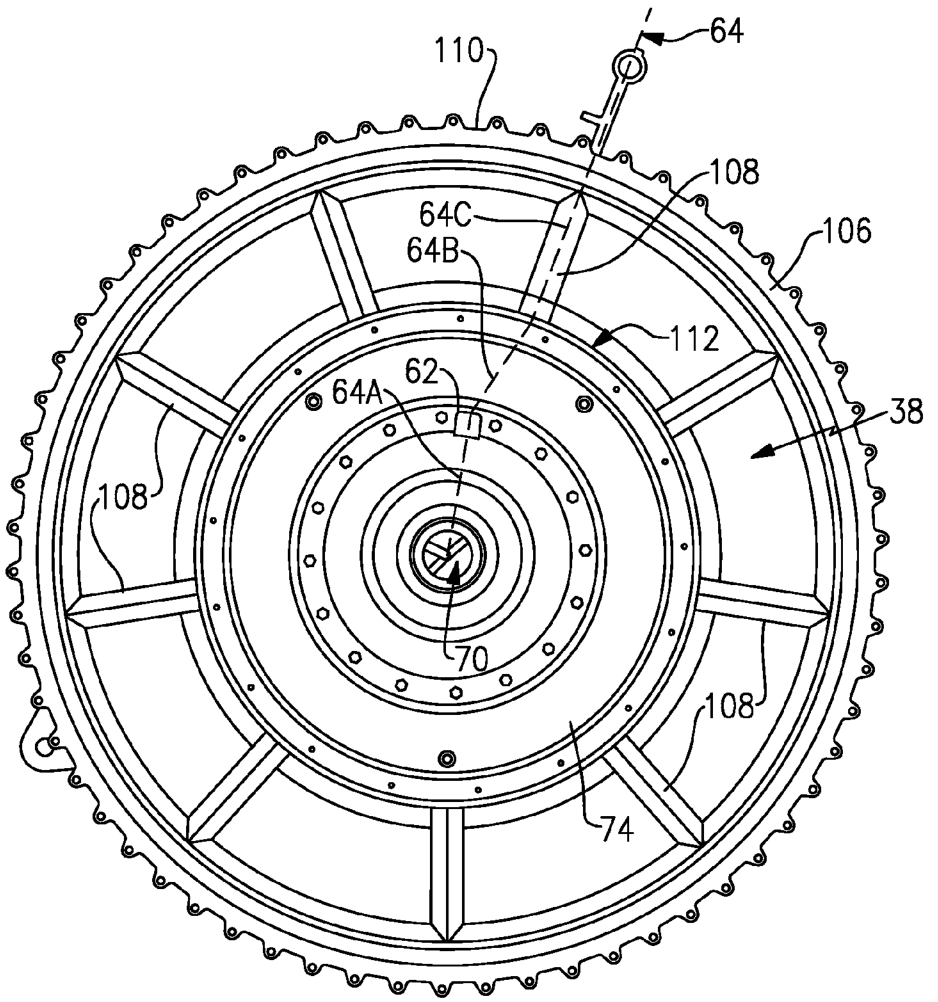
FIG. 5 illustrates a gas turbine engine internal compartment structure.

Referring to FIG. 5, a front view, the bearing system 38 is connected to an intermediate case 106 of the gas turbine engine 20. The intermediate case 106 includes a plurality of struts 108 that are circumferentially disposed about the intermediate case 106 and interconnect between a radially outer body 110 of the intermediate case 106 and a radially outer surface 112 of the bearing system 38. In this example, the wiring 64 (shown in phantom lines) is routed from inside the internal compartment 70 of the bearing system 38, through the integral passageway 62 of the bearing cover 74 and through the scalloped flange(s) of the bearing support 86 and bearing housing 72, and is then routed through one of the struts 108 of the intermediate case 106 to a position that is external of the gas turbine engine 20 for connection to an auxiliary component(s).

The integrally cast passageway of a gas turbine engine internal compartment structure described herein allows wiring to be secured along an entire length of the gas turbine engine internal compartment structure prior to installation of the body onto the gas turbine engine. This protects instrumentation (i.e., sensors, etc.) connected to the wiring and the wiring itself from vibration during engine operation, prevents handling damage during engine assembly, and renders a generally more robust installation. The integral passageway described herein allows wiring to be routed without breaching the compartment walls of the internal compartments of the gas turbine engine and therefore additional sealing is generally not necessary.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine, comprising:

a gas turbine engine internal compartment structure having an integral passageway;

wiring routed through said integral passageway and along a downstream wall of said gas turbine engine internal compartment structure; and wherein said gas turbine engine internal compartment structure includes a radially inner portion, a radially outer portion and a flange that extends between said radially inner portion and said radially outer portion, and said internal passageway includes a first opening through said flange and a second opening through one of said radially inner portion and outer portion.

2. The gas turbine engine as recited in claim 1, wherein said gas turbine engine internal compartment structure is a portion of a bearing system.

3. The gas turbine engine as recited in claim 2, wherein said gas turbine engine internal compartment structure is a bearing cover of said bearing system.

4. The gas turbine engine as recited in claim 1, wherein said wiring is routed from an internal compartment of said gas turbine engine internal compartment structure to a position external from the gas turbine engine.

5. The gas turbine engine as recited in claim 4, wherein a pressure within said internal compartment is different from an ambient pressure.

6. The gas turbine engine as recited in claim 1, wherein said wiring is secured along an entire length of said gas turbine engine internal compartment structure within an internal compartment of said gas turbine engine internal compartment structure.

7. The gas turbine engine as recited in claim 1, wherein said integral passageway is a cast feature of said gas turbine engine internal compartment structure.

8. The gas turbine engine as recited in claim 1, wherein said integral passageway is a machined feature of said gas turbine engine internal compartment structure.

9. The gas turbine engine as recited in claim 1, wherein said integral passageway is a fabricated feature that is attached to said gas turbine engine internal compartment structure.

10. The gas turbine engine as recited in claim 1, wherein said gas turbine engine internal compartment structure is a portion of a gear system.

11. The gas turbine engine as recited in claim 1, wherein said wiring is secured to said downstream wall with at least one tack strap.

12. The gas turbine engine as recited in claim 1, wherein a first portion of said wiring is routed along said radially inner portion, a second portion of said wiring is routed through said internal passageway including through said first opening and said second opening, and a third portion of said wiring is routed along said radially outer portion.

13. A bearing system for a gas turbine engine, comprising:

a bearing housing;

a bearing cover connected to said bearing housing, wherein said bearing cover includes an integral passageway that opens to expose at least a portion of said bearing housing; and wiring routed through an internal compartment of said bearing system, wherein a first portion of said wiring is routed along a radially inner portion of said bearing cover, a second portion of said wiring is routed through said integral passageway, and a third portion of said wiring is routed along a radially outer portion of said bearing cover.

14. The system as recited in claim 13, comprising wiring routed through a portion of said bearing housing and said integral passageway.

15. The system as recited in claim 13, wherein said bearing housing includes a plurality of flanges defined at a radially outer surface.

16. The system as recited in claim 15, wherein said flanges are scalloped flanges.

17. The system as recited in claim 15, comprising wiring routed through said integral passageway and through at least one of said plurality of flanges.

18. The system as recited in claim 13, comprising a bearing support that at least partially extends between said bearing housing and said bearing cover.

19. A gas turbine engine, comprising:

a gas turbine engine internal compartment structure having an integral passageway;

wiring routed through said integral passageway and along a downstream wall of said gas turbine engine internal compartment structure; and wherein said internal passageway includes a housing that protrudes from an upstream wall of said gas turbine engine internal compartment structure.

20. A bearing system for a gas turbine engine, comprising:

a bearing housing;

a bearing cover connected to said bearing housing, wherein said bearing cover includes an integral passageway that opens to expose at least a portion of said bearing housing; and wherein said bearing housing, said bearing cover and a bearing support are mounted to one another, said bearing support including a flange that extends between said bearing housing and said bearing cover.

* * * * *